United States Patent [19]
Lubin et al.

[11] Patent Number: 5,935,392
[45] Date of Patent: *Aug. 10, 1999

[54] ELECTRODES FOR ELECTROLYTIC REMOVAL OF NITRATES FROM WATER, METHODS OF MAKING SAME, AND APPARATUS INCORPORATING SAID ELECTRODES

[75] Inventors: Mark Lubin; Sjef Otten, both of Miami, Fla.

[73] Assignee: Upscale Water Technologies, Inc., Miami, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/758,584

[22] Filed: Nov. 27, 1996

Related U.S. Application Data

[63] Continuation-in-part of application No. 08/671,264, Jun. 26, 1996, Pat. No. 5,614,078, which is a continuation-in-part of application No. 08/457,040, Jun. 1, 1995, abandoned.

[51] Int. Cl.⁶ .................................................... C25B 11/00
[52] U.S. Cl. .................... 204/231; 204/290 R; 204/294; 427/113
[58] Field of Search ............................... 204/290 R, 231, 204/294; 427/113, 372.2, 376.2

[56] References Cited

U.S. PATENT DOCUMENTS

| | | | |
|---|---|---|---|
| 3,446,607 | 5/1969 | Volk et al. | 29/195 |
| 3,632,498 | 1/1972 | Beer | 204/290 F |
| 4,360,417 | 11/1982 | Reger et al. | 204/290 R |
| 4,451,498 | 5/1984 | Hashimoto et al. | 427/38 |
| 5,030,331 | 7/1991 | Sato | 204/38.3 |
| 5,080,963 | 1/1992 | Tatarchuk et al. | 428/225 |
| 5,096,663 | 3/1992 | Tatarchuk | 419/11 |
| 5,098,546 | 3/1992 | Kawashima et al. | 204/290 R |
| 5,156,726 | 10/1992 | Nakada et al. | 204/290 F |
| 5,171,644 | 12/1992 | Tsou et al. | 429/12 |
| 5,256,451 | 10/1993 | Philipp et al. | 427/374.2 |

(List continued on next page.)

OTHER PUBLICATIONS

G. Lodi et al., Microstructure and electrical properties of $IrO_2$ prepared by thermal decomposition of $IrCl_3 \cdot x\, H_2O$: Role Played by the conditions of thermal treatment, J. Electroanal. Chem., vol. 277, pp. 139–150 (1990). No month provided.

(List continued on next page.)

*Primary Examiner*—Arun S. Phasge
*Attorney, Agent, or Firm*—Jones & Askew, LLP

[57] ABSTRACT

A carbon fiber electrode is coated with a noble metal oxide to create a noble metal oxide electrode with a very large surface area. According to a presently preferred embodiment, the noble metal oxide is iridium oxide. A method of making the electrode includes preparing a solution of iridium chloride and isopropyl alcohol, dipping a carbon fiber electrode into the solution, drying the electrode in the presence of nitrogen and heat, and heat treating the electrode in the presence of oxygen. An apparatus for removing nitrates from water includes an electrochemical flow cell through which the aqueous solution containing nitrates flows or a holding tank cell into which the solution is introduced and then released after processing, and an electrode system including an anodic iridium oxide coated carbon fiber electrode as described above, a carbon fiber cathodic electrode and a reference electrode. All of the electrodes are immersed in the aqueous solution and coupled to an electronic control circuit which impresses a voltage across the electrodes such that the voltage causes electrochemical reduction/oxidation reactions on the surface of the cathodic electrode. The electrodes are at a potential wherein nitrates are reduced but hydrogen, oxygen, and chlorine are not produced. Electrodes having different geometries are also provided.

18 Claims, 3 Drawing Sheets

U.S. PATENT DOCUMENTS

| | | | |
|---|---|---|---|
| 5,304,330 | 4/1994 | Tatarchuk et al. | 264/61 |
| 5,393,386 | 2/1995 | Aoyama et al. | 204/78 |
| 5,399,541 | 3/1995 | Ishii et al. | 502/326 |
| 5,460,705 | 10/1995 | Murphy et al. | 204/252 |
| 5,474,965 | 12/1995 | Nakatsuji et al. | 502/330 |
| 5,495,979 | 3/1996 | Sastri et al. | 228/124.1 |

OTHER PUBLICATIONS

J.C.F. Boodts et al., Hydrogen evolution on iridium oxide cathodes, J. Appl. Electrochem., vol. 19, pp. 255–262 (1989). No month provided.

V.M. Jovanovic et al., The roles of the ruthenium concentration profile, the stabilizing component and the substrate on the stability of oxide coating, J. Electroanal. Chem, vol. 339, pp. 147–165 (1992). No month provided.

Y. Sato et al., Electrochromism in iridium oxide films prepared by thermal oxidation of iridium–carbon composite films, J. Electrochem. Soc., vol. 134, No. 3, pp. 570–575 (Mar. 1987).

Y. Kamegaya et al., Improved durability of iridium oxide coated titanium anode with interlayers for oxygen evolution at high current densities, Electrochemica Acta, vol. 40, No. 7, pp. 889–895 (1995). No month provided.

Y. Sato et al., Electrochromism in thermally oxidized iridium oxide films in $LiClO_4$/propylene carbonate, Note (1989). No month provided.

M. Vukovic, Oxygen evolution reaction on thermally treated iridium oxide films, J. Appl. Electrochem., vol. 17, pp. 737–745 (1987). No month provided.

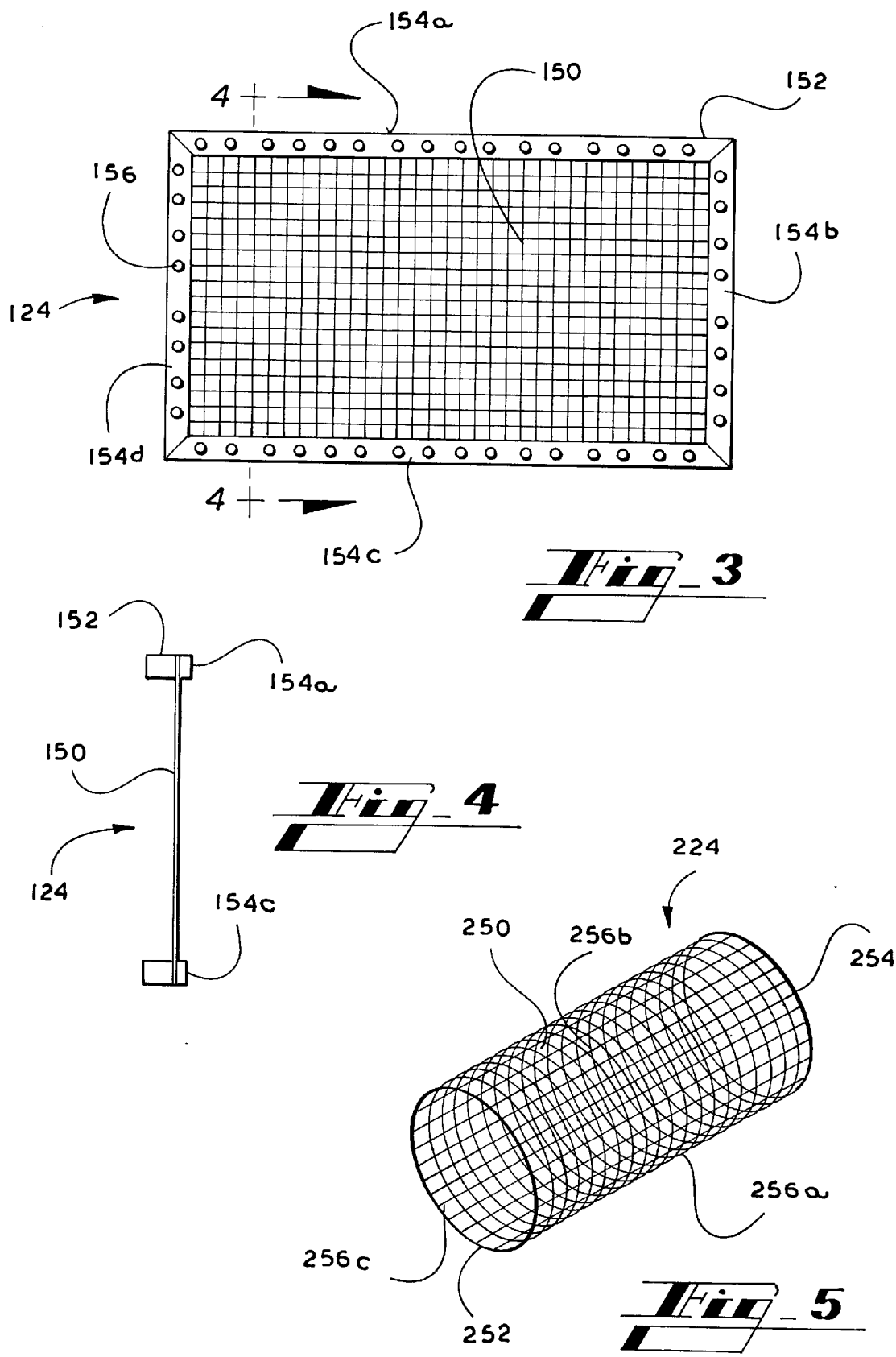

5,935,392

ELECTRODES FOR ELECTROLYTIC REMOVAL OF NITRATES FROM WATER, METHODS OF MAKING SAME, AND APPARATUS INCORPORATING SAID ELECTRODES

This application is a continuation-in-part of allowed application Ser. No. 08/671,264 filed Jun. 26, 1996 now U.S. Pat. No. 5,614,078 which in turn is a continuation-in-part of Ser. No. 08/457,040 filed Jun. 1, 1995, now abandoned, the complete disclosures of which are hereby incorporated herein by reference.

BACKGROUND OF THE INVENTION

1. Field of the Invention

The invention relates to electrochemical reactions and electrodes used therein. More particularly, the invention relates to electrodes for use in the electrochemical removal of nitrates from water, methods for making such electrodes, and apparatus incorporating such electrodes.

2. State of the Art

Parent applications Ser. No. 08/671,264 and Ser. No. 08/457,040 disclose methods and apparatus for the removal of nitrates from water. Although not limited thereto, the apparatus generally includes an electrochemical flow cell through which the aqueous solution containing nitrates flows or a holding tank cell into which the solution is introduced and then released after processing, and an electrode system including a carbon fiber cathodic electrode, a carbon fiber anodic electrode and a reference electrode. All of the electrodes are immersed in the aqueous solution and coupled to an electronic control circuit which impresses a voltage across the electrodes such that the voltage causes electrochemical reduction/oxidation reactions on the surfaces of the cathodic and anodic electrodes. According to the method, the electrodes are at a potential wherein nitrates are reduced to gaseous products but hydrogen, oxygen, chlorine, and other noxious substances are not produced. According to the disclosed preferred embodiment, the reference electrode is a silver/silver-chloride electrode, the cathodic and anodic electrodes are carbon fibers based on polyacrylonitrile (PAN), and the surface area ratio of the anodic electrode to the cathodic electrode is preferably in the range of 40:1 to 120:1.

As disclosed in the parent applications, the anodic to cathodic surface area ratio must be large in order to prevent a chlorine evolution reaction from taking place in salt water and to prevent oxygen evolution reactions and changes in pH in fresh water. In practice, it has been discovered that, in seawater, an anodic to cathodic surface area ratio of up to 150:1 is desirable to prevent chlorine formation under any circumstances. In addition, the anodic voltage (relative to the reference electrode) must be kept below +800 mV to prevent chlorine formation in seawater. Moreover, in flow-through systems, an increased flow rate (flow velocity relative to the cathode) increases the nitrate reduction current and, as a consequence, causes an increase in the anodic voltage.

SUMMARY OF THE INVENTION

It is therefore an object of the invention to provide an improved apparatus for removing nitrates from water.

It is also an object of the invention to provide an improved electrode for use in an apparatus for removing nitrates from water.

It is another object of the invention to provide methods for making an improved electrode for use in an apparatus for removing nitrates from water.

It is a further object of the invention to provide an electrode for use in an apparatus for removing nitrates from water which reduces the anodic to cathodic surface area ratio requirements of the anodic and cathodic electrodes.

Another object of the invention is to provide an electrode for use in an apparatus for removing nitrates from water which can operate at higher anodic voltages without chlorine evolution and without oxygen evolution.

A further object of the invention is to provide an electrode for use in an apparatus for removing nitrates from water which can operate at higher flow rates without raising anodic voltage.

In accord with these objects which will be discussed in detail below, the electrode of the present invention includes a carbon fiber electrode which is coated with a noble metal oxide to effectively create a noble metal oxide electrode with a very large surface area. According to a presently preferred embodiment, the noble metal oxide is iridium oxide. A method of making the electrode includes preparing a solution of iridium chloride compound and isopropyl alcohol, dipping a carbon fiber electrode into the solution, drying the electrode in the presence of nitrogen, and heat treatment of the electrode in the presence of oxygen. The iridium reacts with oxygen to form the iridium oxide coating on the carbon fibers with gaseous hydrochloric acid and chlorine byproducts according to the reaction $H_2IrCl_6 + O_2 \rightarrow IrO_2 + 2HCL$ (gas) $+ 2Cl_2$ (gas). The presently preferred method includes additional rinsing and drying steps and the coating steps may be repeated several times.

An apparatus for removing nitrates from water according to the invention includes an electrochemical flow cell or a holding tank cell and an electrode system including an anodic iridium oxide electrode as described above, a carbon fiber cathodic electrode and a reference electrode. Nitrate laden water is introduced into the holding tank or flows through the flow cell. All of the electrodes are immersed in the nitrate laden water and are coupled to an electronic control circuit which impresses a voltage across the electrodes such that the voltage causes electrochemical reduction/oxidation reactions on the surface of the electrodes. The electrodes are at a potential wherein nitrates are reduced to gaseous products but hydrogen, oxygen, chlorine, and other noxious substances are not produced. According to the presently preferred embodiment of the invention, the reference electrode is a silver/silver-chloride electrode. The flow cell or holding tank is preferably made of an inert material which is non-reactive and non-conductive. The surface area ratio of the anodic electrode to the cathodic electrode is preferably in the range of 20:1 to 30:1. The cathodic voltage is preferably from about −1100 mV to about −1700 mV. The anodic voltage is preferably from about +300 mV to about +800 mV and preferably below +800 mV in seawater or solutions with high chloride content. The water flow velocity in feet per minute is preferably from about 2.5 to about 28.

Additional objects and advantages of the invention will become apparent to those skilled in the art upon reference to the detailed description taken in conjunction with the provided figures.

BRIEF DESCRIPTION OF THE DRAWINGS

FIG. 3 is a plan view of a plate electrode according to the invention;

FIG. 4 is a section taken along line 4—4 in FIG. 3; and

FIG. 5 is a perspective view of a cylindrical electrode according to the invention.

DETAILED DESCRIPTION OF THE PREFERRED EMBODIMENTS

Figure 1:
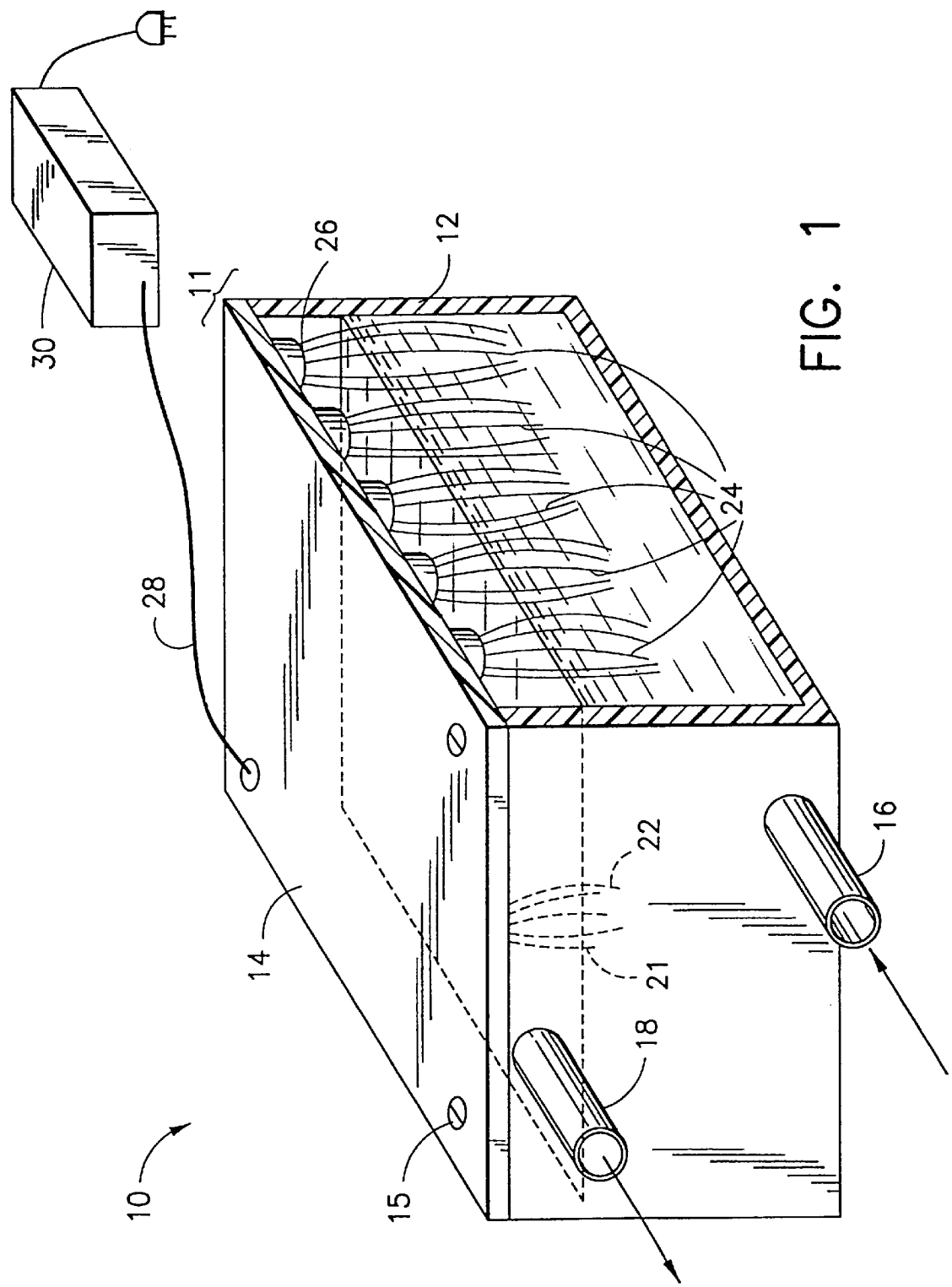
FIG. 1 is a perspective view of an exemplary embodiment of a nitrate reducing apparatus incorporating noble metal oxide electrodes according to the invention.

A noble metal oxide coated carbon fiber electrode (hereinafter referred to as a "noble metal oxide electrode") according to the invention is based on a carbon fiber electrode which is treated as described below. According to a presently preferred embodiment of the invention, the carbon fiber electrode is preferably based on polyacrylonitrile (PAN) although it may also be carbon fibers based on petroleum derivatives and/or phenolic resins. Carbon fiber densities ranging from 1k to 320k fibers per tow are commercially available, although an exemplary embodiment employs a 12k carbon fiber.

An exemplary noble metal oxide electrode according to the invention is an iridium oxide coated carbon fiber electrode (hereinafter referred to as a "iridium oxide electrode"), although other noble metal oxides could be used, for example ruthenium or rhodium. A presently preferred method of making an iridium oxide electrode is described as follows:

Dihydrogen hexachloroiridate ($H_2IrCl_6$) is dissolved in isopropyl alcohol in a concentration of approximately 13.5 grams per liter. The solution is aged at room temperature for eighteen hours. After aging, the solution may be kept for later use by refrigerating it. When ready to use, the solution is warmed to approximately 35° C.

A carbon fiber electrode as described above (e.g., a 12k carbon fiber) is dipped into the warmed solution and then allowed to drip dry. Careful squeezing may be applied if necessary to hasten the drying process by removing excess solution from the electrode prior to heating.

The drip dried carbon fiber electrode is placed in an oven which is pre-heated to approximately 105±5° C. and which has $N_2$ flowing through it after reaching 95° C. The electrode is dried in the oven under $N_2$ for 10–20 minutes and the $N_2$ flow is then stopped. The electrode is then heated to approximately 250±10° C. in air and the electrode is heat treated at this temperature for approximately 1.5 to 1.75 hours. This process can be carried out in the temperature range of 225 and 350° C. During this heating, the iridium reacts with oxygen to form the iridium oxide coating on the carbon fibers with gaseous hydrochloric acid and chlorine byproducts according to the reaction $H_2IrCl_6 + O_2 \rightarrow IrO_2 + 2HCL$ (gas) + $2Cl_2$ (gas). The oven and electrode are then allowed to cool to approximately room temperature before the electrode is removed from the oven.

When the electrode is removed from the oven, it is washed with isopropyl alcohol followed by water to remove any unreacted and unadhered material from the electrode, then air dried or dried in an oven at approximately 100° C. The resulting iridium oxide electrode may then be dipped once again in the solution for a second iridium oxide coating if required, and the process described above repeated. For the purposes described herein, however, a second coating is generally not required. Additional dipping, drying, and treatments can be carried out if desired.

The iridium oxide electrode according to the invention is capable of carrying approximately ten times as much current as the carbon fiber electrode at the same voltage. As such, when used as an anodic electrode in a nitrate removal system such as that described in the parent applications, several important advantages are achieved. First, the anode to cathode surface area ratio requirement is reduced by a factor of approximately ten. Thus, for a given cathode surface area, the surface area of the anode may be decreased by a factor of ten as compared to a system in which both the cathode and the anode are carbon fiber. Alternatively, for a given anode surface area, the surface area of the cathode may be increased by a factor of ten in order to increase the productivity of the system by a factor of ten. Second, the anodic voltage of the iridium oxide electrode is almost completely independent of the flow velocity of fluid past the cathodic electrode. Third, when processing seawater, the cathodic voltage can be somewhat increased without chlorine evolution.

Figure 2:
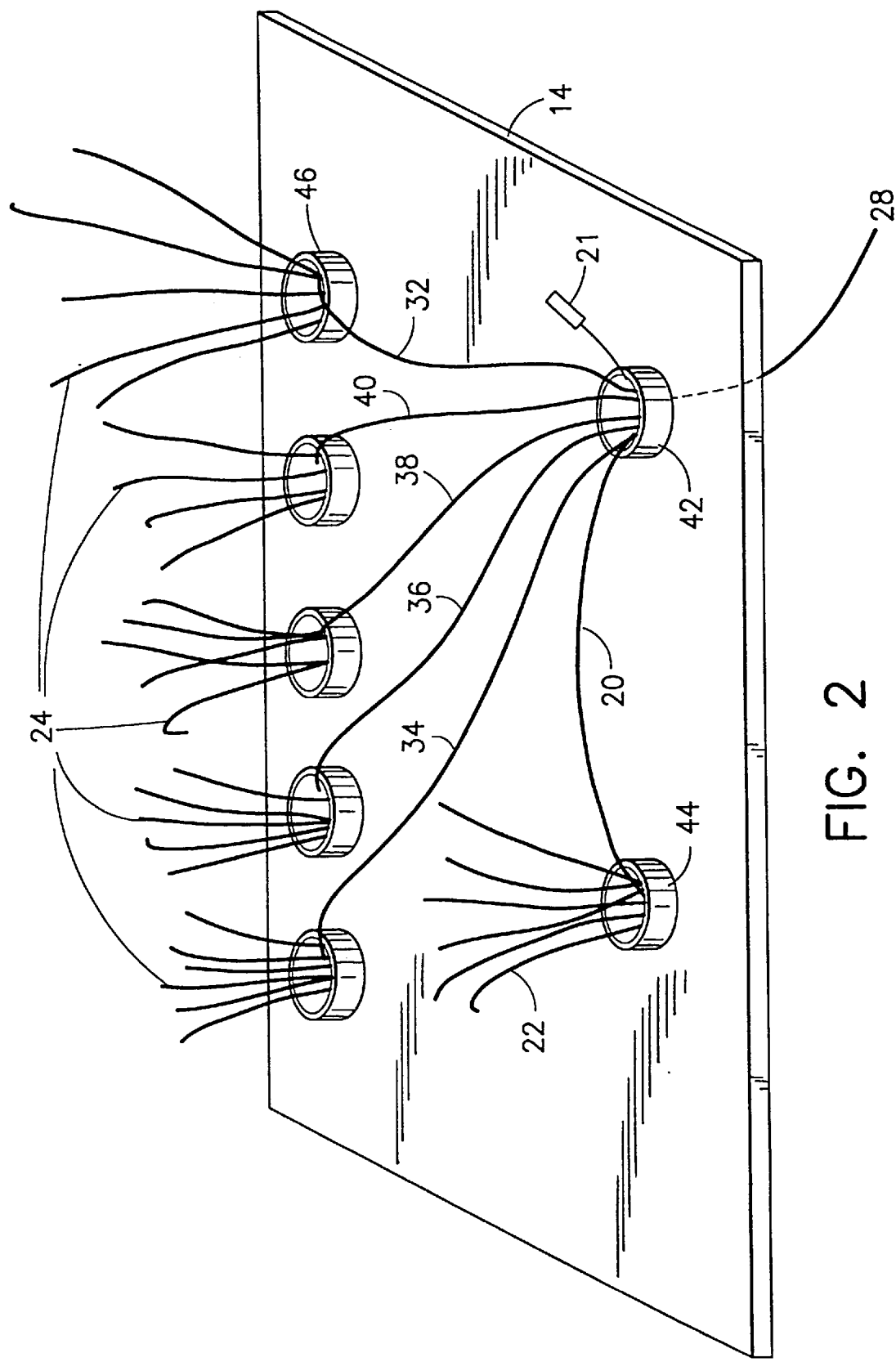
FIG. 2 is an upside down perspective view of the lid and electrode system of the apparatus of FIG. 1.

Iridium oxide electrodes according to the invention have been tested in an apparatus for removing nitrates from water. FIGS. 1 and 2 illustrate such an apparatus incorporating several iridium oxide electrodes. Referring now to FIGS. 1 and 2, an exemplary embodiment a nitrate reducing apparatus is generally illustrated by reference numeral 10. The nitrate reducing apparatus 10 includes a flow cell 11 which includes a container 12 and a lid 14, both preferably formed of polystyrene or other non-conductive material. The lid 14, which is provided merely to prevent foreign material such as dirt from entering the cell, is optionally bolted to container 12 by screws 15. The nitrate reducing apparatus 10 further includes a solution inlet 16 through the side of container 12 and a solution outlet 18 which is spaced apart from the solution inlet 16. A silver/silver-chloride reference electrode 21, a carbon fiber cathodic electrode 22, and a plurality of iridium oxide anodic electrodes 24 are immersed in an aqueous solution in the container 12 and coupled to a voltage source as described below when the nitrate reducing apparatus 10 is operational. The three electrodes of the nitrate reducing apparatus 10 are connected to an electronic control circuit 30 via a cable 28. The electronic control circuit 30 controls the voltage pattern and magnitude applied to the cathode, as described in the parent applications. When a sufficient voltage is applied to the cathode (e.g. −1200 mV), a current flows through the anode and the voltage at the anode rises. The voltage at the cathode produces the nitrate removing reactions and determines the level of current flowing through the anode. As the current through the anode rises, the voltage at the anode rises. If the voltage at the anode is too high, oxygen and/or chlorine can be produced. As explained in the parent application, the anodic voltage is maintained low by increasing the surface area of the anodic electrodes. With the iridium oxide anode of the present invention, a much smaller surface area can produce the same results as a large surface area carbon fiber anode.

Three tests were conducted with the apparatus described above and one control test with a similar apparatus where the iridium oxide electrodes were replaced with carbon fiber electrodes. The results of these tests are summarized in Table 1 below.

TABLE 1

| Test | Water | Cathode | Anode | Anode:Cathode Surface Area Ratio | Cathode Voltage (mV) | Anode Voltage (mV) | Flow Velocity (fpm) |
| --- | --- | --- | --- | --- | --- | --- | --- |
| Control | Sea | Carbon Fiber | Carbon Fiber | 150:1 | −1235 | +750 ± 50 | 2.5 |
| 1 | Sea | Carbon Fiber | Iridium Oxide | 20:1 | −1235 | +750 ± 50 | 2.5 |
| 2 | Fresh | Carbon Fiber | Iridium Oxide | 20:1 | −1400 | +650 ± 50 | 2.5 |
| 3 | Fresh | Carbon Fiber | Iridium Oxide | 30:1 | −1400 | +350 ± 50 | 5 to 28 |

Referring now to Table 1, a control test was performed using the method and apparatus of the parent application using carbon fiber anodes and carbon fiber cathodes where the anode to cathode surface area was approximately 150:1. Sea water was processed with a "working" cathode voltage of approximately −1235 mV and an anode voltage of approximately +750±50 mV was observed. A flow velocity of approximately 2.5 feet per minute was achieved without adversely affecting the anode voltage.

A first test of the apparatus of this invention was performed using carbon fiber cathodes and iridium oxide anodes where the anode to cathode surface area was approximately 20:1. Sea water was processed with a cathode voltage of approximately −1235 mV and an anode voltage of approximately +750±50 mV was observed. A flow velocity of approximately 2.5 feet per minute was achieved without adversely affecting the anode voltage. No chlorine evolution was produced and nitrates were reduced at substantially the same rate as in the control test.

A second test of the apparatus of this invention was performed using carbon fiber cathodes and iridium oxide anodes where the anode to cathode surface area was approximately 20:1. Fresh water was processed with a cathode voltage of approximately −1400 mV and an anode voltage of approximately +650±50 mV was observed. A flow velocity of approximately 2.5 feet per minute was achieved without adversely affecting the anode voltage. No chlorine evolution was produced and nitrates were reduced at substantially the same rate as in the control test.

A third test of the apparatus of this invention was performed using carbon fiber cathodes and iridium oxide anodes where the anode to cathode surface area was approximately 30:1. Fresh water was processed with a cathode voltage of approximately −1400 mV and an anode voltage of approximately +350±50 mV was observed. A flow velocity of approximately 5 to 28 feet per minute was achieved without adversely affecting the anode voltage. No chlorine evolution was produced and nitrates were reduced at substantially the same rate as in the control test.

From the foregoing, those skilled in the art will appreciate that the use of iridium oxide anodes greatly improves the performance of the nitrate reducing apparatus described herein and in the parent applications. In particular, it would appear that the use of iridium oxide (coated carbon fiber) anodes can reduce the anode to cathode surface area ratio requirements by a factor of five or better over the use of plain carbon fiber anodes. In addition, with iridium oxide anodes, the anodic voltage becomes substantially independent of the flow velocity. Further, according to further tests performed when treating seawater, it was observed that the anode voltage can be permitted to rise to +1200 mV without any chlorine evolution. Flow velocities of up to 50 feet per minute were also obtainable without adverse affects on anodic voltage.

Initial tests suggest that the use of iridium oxide cathodes as well as iridium oxide anodes may also enhance the performance of the nitrate reduction apparatus.

The electrodes according to the invention may be made in any of a number of different geometries. As shown in FIGS. 1 and 2, the electrodes are formed as strands which are bunched together to form "pony tails". However, another useful geometry for the electrodes is a plate geometry such as that shown in FIGS. 3 and 4. The plate electrode 124 shown in FIGS. 3 and 4 includes a carbon fiber fabric or mesh 150 which is subjected to the same treatment as described above to create a noble metal oxide coated carbon fiber fabric. The fabric 150 is secured to a rectangular frame 152 by mounting strips 154a–154d. As shown, the mounting strips are secured to the frame with the fabric therebetween by a number of mounting bolts 156. However, those skilled in the art will appreciate that many other methods may be used to secure the fabric to the frame. According to a presently preferred embodiment, either the frame or the mounting strips are made of titanium and the other of the frame or the mounting strips is made of plastic. The plate electrode 124 may be used advantageously in a cell which has slots for holding the electrodes. It will be appreciated that similarly constructed carbon fiber plate electrodes can be used for cathodes in such a cell system.

Still another useful geometry for an electrode according to the invention is shown in FIG. 5. The cylindrical electrode 224 shown in FIG. 5 includes a carbon fiber fabric 250 which is subjected to the same treatment as described above to create a noble metal oxide coated carbon fiber fabric. The fabric 250 is secured to a cylindrical frame which is made from two hoops 252, 254 and several longitudinal supports 256a–256c. The cylindrical electrode 250 is ideally utilized with a similarly configured cylindrical carbon fiber cathode (not shown) which is mounted coaxially with the cylindrical anode 250. A cylindrical flow cell (not shown) is advantageously provided to house the cylindrical anode and cathode.

There have been described and illustrated herein embodiments of an iridium oxide electrode, methods of making an iridium oxide electrode, and an apparatus for reducing nitrates utilizing an iridium oxide electrode. While particular embodiments of the invention have been described, it is not intended that the invention be limited thereto, as it is intended that the invention be as broad in scope as the art will allow and that the specification be read likewise. Thus, while particular carbon fiber substrates have been disclosed for making iridium oxide electrodes, it will be appreciated that other substrates having suitable surface area could be utilized. Also, while iridium oxide has been shown as a presently preferred noble metal oxide electrode, it will be recognized that other types of noble metal oxide electrodes could be used with similar results obtained. Moreover, while particular configurations have been disclosed in reference to an apparatus which utilizes the iridium oxide electrode, it will be appreciated that other configurations could be used as well. For example, while the apparatus has been described with reference to a flow cell or a holding tank, it is possible to use the electrodes and apparatus of the invention in a one-pass open system such as in a running stream, without the need for a tank or flow cell. It will therefore be appreciated by those skilled in the art that yet other modifications could be made to the provided invention without deviating from its spirit and scope as so claimed.

We claim:

1. An electrode for use in an electrochemical reaction, said electrode comprising:

a polyacrylonitrile based carbon fiber substrate coated with a noble metal oxide, wherein said noble metal oxide is iridium oxide.

2. An electrode according to claim 1, wherein:

said carbon fiber substrate has approximately 12 k fibers per tow.

3. An electrode according to claim 1, wherein:

said carbon fiber substrate coated with a noble metal oxide is a carbon fiber substrate coated with a noble metal oxide which was dried in the presence of substantially pure nitrogen.

4. An electrode according to claim 1, wherein:

said substrate has the geometry of one of a pony tail, a fabric plate, and a fabric cylinder.

5. A method of making an electrode for use in an electrochemical reaction, comprising:

a) dissolving an iridium chloride compound in alcohol to form an iridium chloride solution;

b) dipping a polyacrylonitrile based carbon fiber electrode in the solution; and c) heat treating the dipped electrode in at approximately 225–350° C. for 1.5 to 1.75 hours.

6. A method according to claim 5, wherein:

prior to said dipping a carbon fiber electrode, the solution is warmed to approximately 35° C.

7. A method according to claim 6, wherein:

prior to warming the solution, the solution is aged at room temperature for approximately 18 hours.

8. A method according to claim 5, wherein:

prior to said step of heat treating, the dipped electrode is dried in the presence substantially pure $N_2$ at approximately 105±5° C. for approximately 10–20 minutes.

9. A method according to claim 5, further comprising:

d) forming the carbon fiber electrode as a fabric sheet; and e) attaching the fabric sheet to a frame.

10. An apparatus for reducing nitrates in an aqueous solution, comprising:

a) a cathodic electrode;

b) a reference electrode;

c) an iridium oxide coated carbon polyacrylonitrile based fiber anodic electrode; and d) a control circuit which impresses a voltage across said electrodes.

11. An apparatus according to claim 10, wherein:

said cathodic electrode is a carbon fiber electrode.

12. An apparatus according to claim 10, further comprising:

e) an electrochemical cell in which the aqueous solution containing nitrates is treated.

13. An apparatus according to claim 10, wherein:

said cell is a flow cell through which the aqueous solution flows at a flow rate relative to said cathodic electrode in the range of 0.1 to 50 feet per minute.

14. An apparatus according to claim 10, wherein:

the anodic electrode to cathodic electrode surface area ratio is in the range of 5:1 to 30:1.

15. An apparatus according to claim 10, wherein:

said anodic electrode has the geometry of one of a pony tail, a fabric plate, and a fabric cylinder.

16. An apparatus according to claim 10, wherein:

said voltage across said cathodic electrode relative to said reference electrode is between approximately −1100 mV to approximately −1700 mV, and said voltage across said anodic electrode relative to said reference electrode is below approximately +800 mV.

17. An apparatus for reducing nitrates in an aqueous solution, comprising:

a) a cathodic electrode;

b) a reference electrode;

c) a noble metal oxide coated carbon fiber anodic electrode, said noble metal oxide coated carbon fiber anodic electrode being coated with a single species noble metal oxide, said single species consisting of iridium oxide; and d) a control circuit which impresses a voltage across said electrodes.

18. An electrode for use in an electrochemical reaction, said electrode comprising:

a carbon fiber substrate coated with a single species of noble metal oxide, said single species consisting of iridium oxide.

* * * * *